United States Patent
Bares et al.

(10) Patent No.: US 10,074,060 B2
(45) Date of Patent: Sep. 11, 2018

(54) SYSTEM AND METHOD TO TRACK TIME AND ATTENDANCE OF AN INDIVIDUAL AT A WORKPLACE

(71) Applicant: API Healthcare Corporation, Hartford, WI (US)

(72) Inventors: Jill Bares, Fredonia, WI (US); Christopher Daute, Hartford, WI (US); Jonathan Tallon, Hartand, WI (US); Gregory Bodden, Jackson, WI (US); Emanuel Gagliardi, San Antonio, TX (US)

(73) Assignee: API Healthcare Corporation, Seattle, WA (US)

( * ) Notice: Subject to any disclaimer, the term of this patent is extended or adjusted under 35 U.S.C. 154(b) by 649 days.

(21) Appl. No.: 14/803,609

(22) Filed: Jul. 20, 2015

(65) Prior Publication Data

US 2017/0024683 A1    Jan. 26, 2017

(51) Int. Cl.
*G06K 7/10* (2006.01)
*G06Q 10/06* (2012.01)

(52) U.S. Cl.
CPC .......................... *G06Q 10/063116* (2013.01)

(58) Field of Classification Search
CPC ........... G07C 1/14; G07C 1/10; G06Q 10/109
USPC ................................................. 235/377, 380
See application file for complete search history.

(56) References Cited

U.S. PATENT DOCUMENTS

| | | | |
|---|---|---|---|
| 4,170,015 A | 10/1979 | Elliano et al. | |
| 4,270,043 A | 5/1981 | Baxter et al. | |
| 4,812,627 A | 3/1989 | Wexler et al. | |
| 4,819,162 A | 4/1989 | Webb, Jr. et al. | |
| 5,717,867 A | 2/1998 | Wynn et al. | |
| 5,970,466 A | 10/1999 | Detjen et al. | |
| 6,356,875 B1 | 3/2002 | Green et al. | |
| 6,823,315 B1 | 11/2004 | Bucci et al. | |

(Continued)

FOREIGN PATENT DOCUMENTS

JP      2007-264959 A    10/2007
KR    10-2010-0104183 A    9/2010

(Continued)

OTHER PUBLICATIONS

KRONOS; "When Is Time Not on Your Side?", Time and Attendance; 8 pages.

(Continued)

*Primary Examiner* — Ahshik Kim
(74) *Attorney, Agent, or Firm* — Hanley, Flight and Zimmerman, LLC (57) ABSTRACT

A system and method to track time and attendance of an individual at a workplace is provided. The system includes a location tracking system that detects a presence of a portable electronic device carried by the individual, a time clock system that records clock-out registration time of the individual at the workplace, and a main controller. If the main controller receives an electronic communication indicative that the portable electronic device is located at a predefined break or non-work area, and if the main controller does not detect recording of the individual clock-out registration time at the time clock system, then main controller automatically causes an alert at the portable electronic device prompting the individual to transmit a feedback signal acknowledging need to record the clock-out registration time.

20 Claims, 5 Drawing Sheets

(56) References Cited

U.S. PATENT DOCUMENTS

| | | |
|---|---|---|
| 7,004,389 B1 | 2/2006 | Robinson et al. |
| 7,081,743 B2 | 7/2006 | Liu et al. |
| 7,266,048 B1 | 9/2007 | King et al. |
| 7,489,595 B2 | 2/2009 | King et al. |
| 7,562,026 B2 | 7/2009 | DelMonego et al. |
| 7,587,329 B2 | 9/2009 | Thompson et al. |
| 7,817,012 B2 | 10/2010 | Ehlinger et al. |
| 8,355,924 B2 | 1/2013 | Hertel et al. |
| 8,359,221 B2 | 1/2013 | Gala |
| 8,380,534 B2 | 2/2013 | Reynolds et al. |
| 8,392,920 B2 | 3/2013 | Ostrovsky et al. |
| 2003/0220815 A1 | 11/2003 | Chang et al. |
| 2010/0204999 A1 | 8/2010 | Scarola |
| 2011/0068892 A1 | 3/2011 | Perkins et al. |
| 2017/0011346 A1 | 1/2017 | Dickerson et al. |

FOREIGN PATENT DOCUMENTS

| | | |
|---|---|---|
| KR | 10-2013-0120119 A | 11/2013 |
| KR | 10-2014-0075932 A | 6/2014 |
| KR | 10-1488932 B1 | 2/2015 |

OTHER PUBLICATIONS uAttend BN5000 Biometric Fingerprint Time Clock; as viewed on Costco.com on Feb. 11, 2015; 1 page.

International Search Report and Written Opinion for International Application No. PCT/US2016/042899, dated Oct. 28, 2016, 11 pages.

| EMPLOYEE | TAG# | SCHEDULED CLOCK-OUT [BREAK OR WORKSHIFT] | LOCATION/TIME DETECTED | | CLOCK OUT | REMINDERS SENT |
|---|---|---|---|---|---|---|
| | | | LAST WORKSHIFT PRESENCE | BREAK PRESENCE | | |
| JOHN DOE | 1234 | 12/1/2014 07:00 3WEST | 3WEST | 07:05 | 07:07 | 07:05 |
| JANE DOE | 1235 | 12/1/2014 08:00 3NORTH | 3NORTH | 08:04 | | 08:05, 08:15, 08:30 |
| FRED DOE | 1236 | 12/1/2014 09:00 PEDS | | | | MANAGER AT 09:05 |
| | | | | | | |
| | | | | | | |
| | | | | | | |

FIG. 5

SYSTEM AND METHOD TO TRACK TIME AND ATTENDANCE OF AN INDIVIDUAL AT A WORKPLACE

TECHNICAL FIELD

The subject herein generally relates to a system and method to track notification to register a logout by an individual from a scheduled workshift, and more specifically to a system and method operable to electronically trigger prompt of an individual to register at a time clock for clock-out from a scheduled workshift.

BACKGROUND

The statements in this section merely provide background information related to the disclosure and may not constitute prior art. Time and attendance systems typically include employee time clock systems, whether mechanical punch clocks or electronic, at workplaces to assist employers in the tracking of time worked by employees. The time clock system collects date and time information collected with respect to the employee to establish a record to be used by payroll departments in calculating the appropriate pay for the employee. Certain known time clock systems employee various biometric technologies to verify the unique identity of the employee, including fingerprints or retina scans. Yet, current time and attendance systems still require significant supervisory or managerial time and expense to review the time clock transactions (e.g., clock-in, clock-out) for compliance with work schedules, overtime, and other rules and regulations, as well as to make appropriate corrections for payroll calculations. Known attempts to reduce this expense have been limited to employee education and discipline.

BRIEF SUMMARY

In view of the above recited concerns, there is a need for a system and method of time and attendance that automatically and in general real-time monitors employee presence and compliance with recording or registration of logout at the time clock system, and that automatically triggers electronic communications of alert so as to reduce payroll review, correction and human intervention while sustaining employer-employee goodwill. The above-described needs are addressed by the embodiments of the subject matter described herein.

According to one aspect of the subject matter, a system to track a time and an attendance of an individual at a workplace is provided. The system includes a location tracking system that detects a presence of a portable electronic device carried by the individual, a time clock system that records clock-out registration time of the individual at the workplace, and a main controller. If the main controller receives an electronic communication indicative that the portable electronic device is located at a predefined break or non-work area, and if the main controller does not detect recording of the individual clock-out registration time at the time clock system, then main controller automatically causes an alert at the portable electronic device prompting the individual to transmit a feedback signal acknowledging need to record the clock-out registration time.

According to another aspect, a method to track a time of attendance of an individual for a workshift at a workplace is provided. The method comprises the steps of: detecting via a wireless reader a location data indicative of a presence of a portable electronic device uniquely associated with and carried by the individual, the portable electronic device including a first microprocessor connected to an interface; detecting a clock-out registration time of the individual at a time clock system; storing an information data of a workshift time period and predefined area of workplace for a scheduled workshift data file of the individual at a workshift database, the workshift time period including a start time, an end time, and an intermediate break start and end time between the workshift start time and the end time; and in response to 1) a main controller receiving an electronic communication indicative that the portable electronic device is not at a predefined work area of the workplace per information data of the scheduled workshift data file, and 2) not detecting a clock-out registration time at the time clock system by the individual, then main controller automatically causing an alert at the portable electronic device prompting the individual to transmit a feedback signal acknowledging need to record the clock-out registration time at the time clock system.

This summary briefly describes aspects of the subject matter described below in the Detailed Description, and is not intended to be used to limit the scope of the subject matter described in the present disclosure.

BRIEF DESCRIPTION OF THE DRAWINGS

The features and technical aspects of the system and method disclosed herein will become apparent in the following Detailed Description in conjunction with the drawings in which reference numerals indicate identical or functionally similar elements.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. The term user and/or the plural form of this term are used to generally refer to those persons capable of accessing, using, or benefiting from the present disclosure. As used herein, when the phrase "at least" is used, it is open-ended in the same manner as the term "comprising" is open-ended.

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
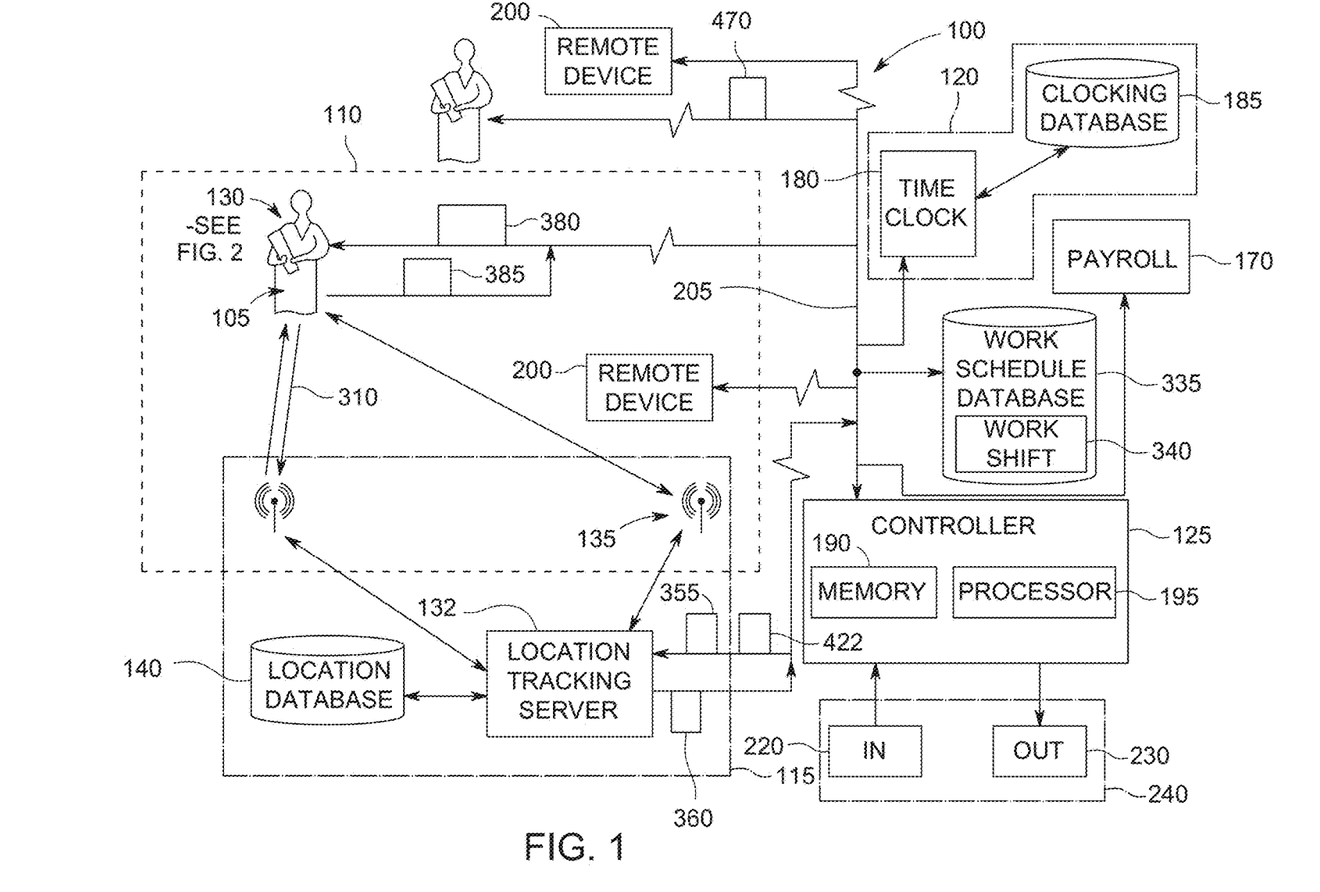
FIG. 1 shows a schematic block diagram of an example of a system in accordance to the subject matter described herein.

FIG. 1 illustrates one embodiment of a system 100 to track a time and an attendance of an individual 105 at a predefined area 110 of a workplace. The system 100 includes a location tracking system 115, and a time clock system 120 connected in communication with a main controller 125. Examples of the individual 105 can be an employee of the workplace, a contractor or consultant or other third party person, etc. and is not limiting on the subject matter described herein.

The location tracking system 115 can be generally operable to track a presence of a portable electronic device 130 carried by the individual 105 within the predefined area 110 of the workplace in general real-time for electronic transmission and processing of the information. An example of the location tracking system 115 can include a main location tracking computer or computer server 132 in communication with a stationary device 135 (e.g., transceiver) operable to communicate back and forth with the portable electronic device 130 uniquely associated with an individual identification and carried by individual 105. The location tracking system 115 can employ various types of wireless technology (e.g., optical, radio frequency (RF), bar code scanning, ultrasound, global positioning (GPS), wireless local area network (WLAN), ultra-wide band (UWB), ultra high frequency (UHF), BLUETOOTH™, ZIGBEE™, WI-FI™, cellular-based positioning, infrared (IR), etc. or combination thereof) to track location of the portable electronic devices 130, and is not limiting on the subject matter described herein. The location tracking system 115 can include or otherwise be connected in communication with a location tracking database 140 for recording or storage of collected location data acquired by or received from the location tracking system 115 with respect to unique individual identifier uniquely associated with the portable electronic device 130.

Figure 2:
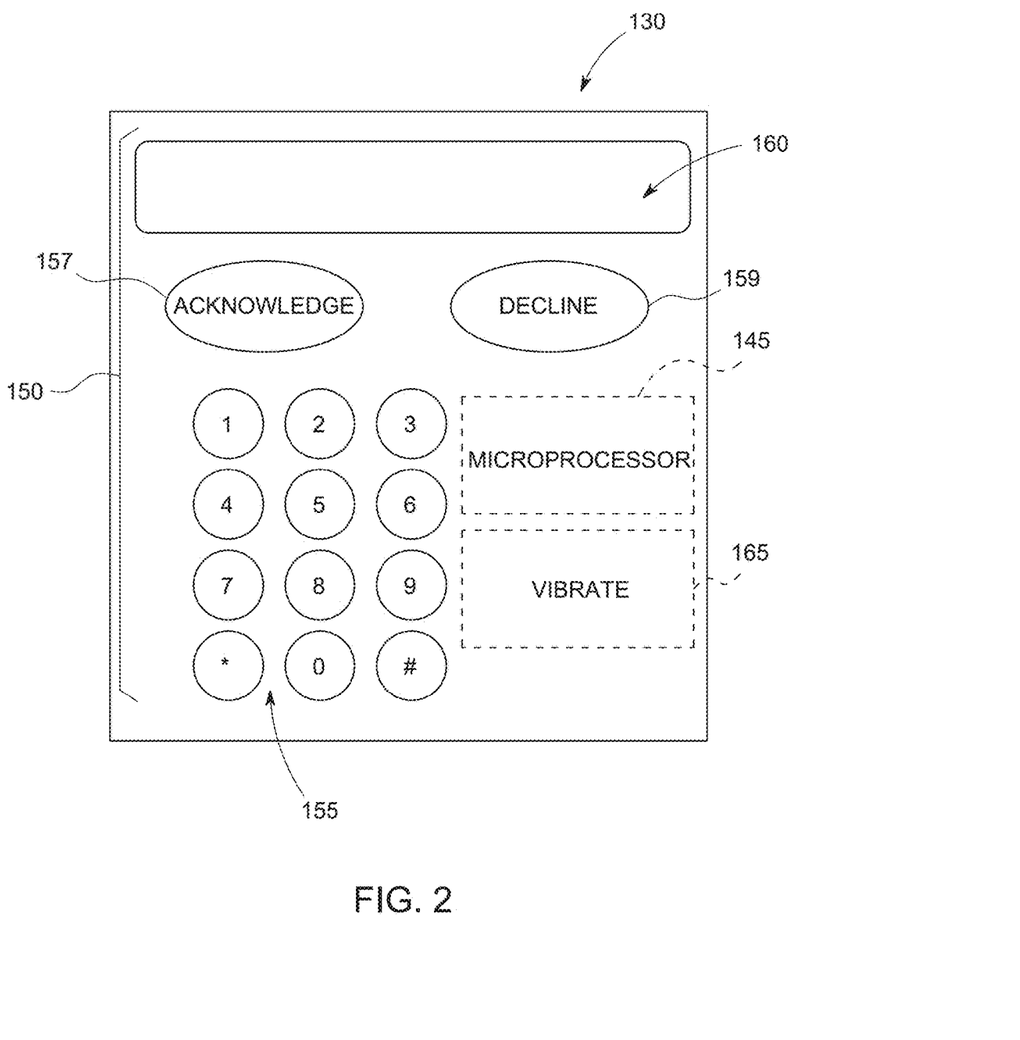
FIG. 2 shows a schematic diagram of an example of a portable electronic device employed in the system of FIG. 1 in accordance with the subject matter described herein.

Referring to FIG. 2, an example of the portable electronic device 130 can be generally operable to have its presence detected or tracked by the location tracking system 115. The portable electronic device 130 can include or be in the form of a passive or active identification tag or badge, cellular or mobile phones, etc. or combination thereof, having a microprocessor 145 connected to an interface 150. The interface 150 can include various input devices generally operable to receive instructions from the individual 105 for communication to the main controller, as well as an output device generally operable to illustrate feedback to the individual 105 as communicated from the main controller. An example of the input device include a keypad or selector buttons 155, 157, 159 (e.g., mechanical or touch-activated), that when triggered instructs the portable electronic device 130 to communicate instructions to the main controller 125. The illustrated example of the portable electronic device 130 shown in FIG. 2 includes a keypad 155, an acknowledge selector button 157, and a decline selector button 159. An example of the output device can include a visual indicator 160 (e.g., LCD screen, LED light, etc.) or an audible indicator 165 or combination thereof operable to communicate feedback or electronic formatted message content communicated from the main controller.

Referring back to FIG. 1, the time clock system 120 can be generally operable to track or record a current date and clock-in (i.e., start) or clock-out (i.e., end) associated with a unique individual identifier at a place of employment. The time clock system 120 can be operable to translate information with respect to transactions by the individual 105 to clock-in (ie, registration at time clock system 120 to record start of work) or clock-out (ie, registration at time clock system 120 to record end of work) at the time clock system 120 into an electronic format for communication to other systems 170 for developing accounting records and reports, to generate payroll, etc. Examples of the time clock system 120 can be in hard-wired or wireless communication with other parts of the system 100. The time clock system 120 can include an internal clock mechanism to track current date and time, and employ readers or scanners operable to read information data associated with individual identification cards or tags or badges. The time clock system 120 can further include a local display 180 to visualize a category of the transaction (e.g., clock-in, clock-out, etc.) associated with a unique individual identifier, as well as the recorded current time and date for time and attendance purposes for storage and retrieval with a clocking database 185. The time clock system 120 can also employ other technologies to verify the unique identification associated with an action of the individual 105, including facial recognition, fingerprint scanning, retina scanning, etc. and is not limiting on the subject matter described herein.

The main controller 125 can be generally operative to receive, process, and convey information in the form of electronic communications to and from the location tracking system 115 and the time clock system 120. The example of the main controller 125 can generally include a memory 190 having a series of computer readable program instructions for execution by a computer processor 195. The example memory 190 can be a computer program product including a non-transitory, tangible, computer readable medium of varying type generally operable to store electronic formatted data or information and computer readable program instructions accessible and readable by the computer processor 195. In certain examples, the memory 190 can be accessible by a remote computing device 200 or the portable electronic device 130 carried by the individual 105 or supervisor via a network connection 205.

The computer-readable instructions can comprise a programming code for execution by the computer processor 195. The programming code can be embodied in software stored on the memory 190 independent of or in combination with software embodied in firmware or dedicated hardware. The computer program product may be stand-alone or integrated as part of the main controller 125. As used herein, the term tangible, non-transitory computer readable storage medium can be expressly defined to include any type of computer readable storage device and/or storage disk and to exclude propagating signal media and to exclude transmission media. As used herein, "tangible, non-transitory computer readable storage medium" and "tangible, non-transitory machine readable storage medium" can be used interchangeably.

Examples of the memory 190 can include, but are not limited to, random access memory (RAM), read only memory (ROM), Synchronous Dynamic Random Access Memory (SDRAM), Dynamic Random Access Memory (DRAM), EEPROM, flash memory, a cache, compact disc (CD), digital versatile disc (DVD) or other optical storage, magnetic cassettes, magnetic tape, magnetic disk storage or other magnetic storage devices, a hard drive, a flash memory, or any other medium which can be used to store the desired electronic format of information or program instructions for a duration and which can be accessed by the computer processor 195 or at least a portion of the main controller 125.

The example computer processor 195 can include hardware to execute one or more tasks as defined by the computer readable program instructions. The computer processor 195 can be, for example, part of a computer server, a laptop or desktop, a mobile device (e.g., a cell phone, a smart phone, a tablet such as an IPAD™), a personal digital assistant (PDA), an Internet appliance, or any other type of known computing device. For example, the computer processor 195 can be implemented by one or more integrated circuits, logic circuits, microprocessors or controllers from any desired family or manufacturer.

The memory 190 and computer processor 195 as referred to herein can be stand-alone or integrally constructed as part of various programmable computing devices of various types, including for example a cache, a desktop computer or laptop computer hard-drive, field-programmable gate arrays (FPGAs), application-specific integrated circuits (ASICs), application-specific standard products (ASSPs), system-on-a-chip systems (SOCs), programmable logic devices (PLDs), etc. or the like and any combination thereof operable to execute the instructions associated with implementing the method (discussed later) of the subject matter described herein.

The controller 125 of the system 100 can also be configured to communicate instructions to and from the remote computer devices 200. Examples of remote computer devices 200 as referenced herein can include: a mobile telephone; a computer such as a desktop or laptop type; a Personal Digital Assistant (PDA) or mobile phone; a notebook, tablet or other mobile computing device; or the like and any combination thereof. The subject matter of this description may be implemented as a stand-alone computer program product or as an application configured for execution by one or more of the remote computing devices 200. The application (e.g., webpage, downloadable applet or other mobile executable) can generate the various displays or graphic/visual representations described herein as graphic user interfaces (GUIs) or other visual illustrations, which may be generated as webpages or the like, in a manner to facilitate interfacing (receiving input/instructions, generating graphic illustrations) with users via the remote computing device(s) 200.

The network 205 can facilitate transmission of electronic format or digital data. The example network 205 can be a wired interface (e.g., a data bus, a Universal Serial Bus (USB 2.0 or 3.0) connection, etc.) and/or a wireless interface (e.g., radio frequency, infrared, optical, near field communication (NFC), etc.), a wide area network (WAN); a local area network (LAN); the Internet; a cloud-based computing infrastructure of computers, routers, servers, gateways, etc.; or any combination thereof associated therewith that allows the system 100 or portion thereof to communicate with various computing devices 200 described above.

With respect to the example of the network 205 as including a cloud-based infrastructure, the system 100 can share information via web-based applications, cloud storage and cloud services. For example, a Web-based portal may be used to facilitate access to information, etc. The system 100 can illustrate the Web-based portal as a central interface to access information and applications, and data may be viewed through the Web-based portal or viewer, for example. Additionally, data may be manipulated and propagated using the Web-based portal, for example. The Web-based portal can be accessible locally (e.g., in an office) and/or remotely (e.g., via the Internet and/or other network or connection 160), for example.

The main controller 125 can also be in communication with an input or input device 220 and an output or output device 230. Examples of the input device 220 include a keyboard, joystick, mouse device, touch-screen, track ball, light wand, voice control, or similar known input device known in the art. Examples of the output device 230 include a liquid-crystal monitor, a plasma screen, a cathode ray tube monitor, a touch-screen, a printer, audible devices, etc. The input device 220 and output device 230 can be independent of one another, or combination as an interface 240 to the system 100.

Having provided an example of one construction of the system 100 as shown in FIG. 1 in accordance with above-description, the following is a description of an example of a method 300 (See FIG. 3) to operate the system 100 in accordance with the subject matter described herein. It should also be understood that the sequence of the acts or steps of the method 300 as discussed in the foregoing description can vary. Also, it should be understood that the method 300 may not require each act or step in the foregoing description, or may include additional acts or steps not disclosed herein. It should also be understood that one or more of the steps of the method 300 can be represented by one or more computer program modules of computer-readable program instructions stored in the memory 190 of the system 100. As mentioned above, the method 300 can be implemented using coded instructions (e.g., computer and/or machine readable instructions). The terms module and component as referenced herein can generally represent program code or instructions that causes specified tasks when executed on the computer processor 195. The program code can be stored in one or more computer readable mediums that comprise the memory 190.

Figure 3:
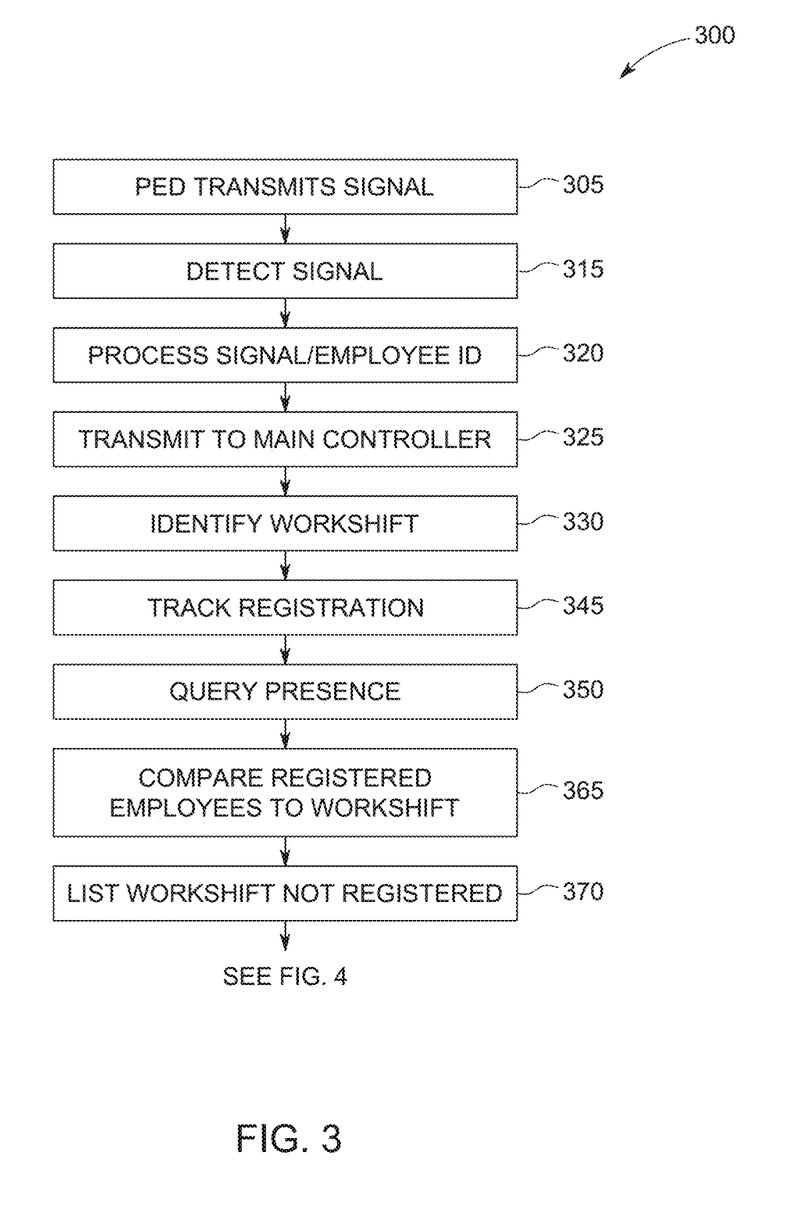
FIG. 3 illustrates a first part of a work flow diagram as an example of a method of operating the system of FIG. 1 in accordance with the subject matter described herein.

Referring to FIG. 3 and for sake of example, assume step 305 includes detecting presence of a portable electronic device 130 uniquely associated with and carried with the individual 105 at the workplace. An example of step 305 can include the portable electronic device 130 transmitting a location or presence signal 310 (See FIG. 1) including the individual identifier data code associated with the portable electronic device 130 (See FIG. 1). Step 315 can include the stationary reader 135 of the location tracking system 115 detecting receipt of the presence signal 310. Step 320 can include computer processing the presence signal 310 to detect and identify the unique individual identification data code associated with a location data of the stationary reader 135. Step 325 can include transmitting a signal with the location data and associated individual identifier data code to the main controller 125. This example assumes that the portable electronic device 130 at least periodically transmits the presence signal 310. Alternatively, the portable electronic device 130 can interact in various other ways (e.g., passively) with the location tracking system 115 or combination thereof. The type of communicative interaction in detecting the location or presence data of the portable electronic device 130 via the location tracking system 115 can vary and is not limiting on the subject matter described herein.

Also, assume for example, step 330 includes the system 100 retrieving, from a scheduling database 335, stored information data of a predefined or predetermined workshift data file 340. The information data elements of the workshift data file 340 can be in electronic or digital format and include a list of unique identifier code for the individuals 105 scheduled to work for a time period or time frame having a start time (e.g., clock-in time) and an end time (e.g., clock-out) for the individual 105 to begin and end, respectively, for a particular date of employment at the workplace of employment, including required clock-out and clock-in for breaks such as lunch. The start time and end time can be a distinct time value or a threshold value range. The information data elements of the workshift data file 340 can be stored in electronic format in the schedule database 313 for retrieval via the microprocessor of the main controller 125 of the system 100.

Step 345 can include the time clock system 120 recording the registration time of the attendance (e.g., clock-in) associated with the unique individual identifier code of the individual 105 at the predefined area 110 of the workplace. Step 345 can include comparing the list of individual identifier codes of individuals 105 tracked to have registered (e.g., clocked-in) at the time clock system 120 in comparison to the list of individual identifier codes of individuals 105 scheduled per the information data elements of the predefined workshift data file 340.

Step 345 can further include detecting those individual identifier codes associated with the individuals 105 that have not recorded a registration time at the time clock system 120 in non-compliance with the list of individual identifier codes of individuals 105 scheduled per the information data elements of the predefined workshift data file 340. An example of step 345 can include detecting if a candidate information data elements of the individual identifier code of an individual 105 is currently within a predefined scheduled time period of the work shift 340 associated with the individual 105 at the workplace, and include the main controller 125 executing program instructions, automatically in response to the start time of the predefined workshift data file 340, to search the work schedule database 335 of the system 100 and to identify the individual identifier code of the individual 105 associated with exceeding the predefined scheduled start time of the information data of the predefined workshift time period without recording the registration time at the time clock system 120.

For those individual identifier codes of individuals 105 detected or tracked by the main controller 125 not to have registered at the time clock system 120 for the workshift data file 340, step 350 can include querying for detection of the individual codes of the individuals 105 indicative of the presence of the individual 105 at the predefined work area of the workplace. In response to step 345 identification of no registration of the individual 105 for the prescheduled workshift data file 340, step 350 can include automatically triggering transmission of an electronic communication or message 355 from the main controller 125 that instructs or triggers the location tracking system 115 to transmit a feedback signal or communication 360 indicative of recording a most recent or last stored locative data indicative of the presence of the portable electronic device 130 and/or unique identifier code associated with unregistered individuals 105 is recorded within a predefined scheduled time period of the work shift 340. Step 350 can also include transmission of the electronic communication 355 from the main controller 120 that triggers a search of the location database of the location tracking system 115 for any location data indicative of the portable electronic device 130 of the individual 105 at the workplace for the predefined workshift data file 340.

Step 365 can include comparing the feedback signal or communication 360 from the location tracking system 115 received in response to step 350, with the information data in the workshift data file 314. The transmission of the feedback signal 360 from the location tracking system 115 can include data indicative of the last recorded location data with respect to detected presence of the individual identifier code and/or portable electronic device 130 associated with the individual 105 at the predefined area 110 of the workplace, for comparison to information data of the individual identifier and scheduled location associated with the individual identifier of the individual 105 in accordance to stored information data of workshift data file 314. From step 365, step 370 can include identifying and creating a list of individual identifier codes and associated portable electronic devices 130 associated with the individuals 105 identified as having location data indicative of presence at the predefined area 110 of the workplace, scheduled for an applicable workshift data file, but not recorded a registration time at the time clock system 120.

In response if the system 100 detects that currently within a predefined scheduled work shift time period associated with an identifier code of the individual 105 at the predefined space 110 of the workplace without detecting that the individual 105 recorded a registration time at the clock system 120, step 375 can include identifying if already transmitted an electronic communication or message or signal 380 to the portable electronic device 130 that triggers an alert or notification prompting for a feedback signal 385 to be transmitted from the portable electronic device 130 acknowledging need for the individual 105 to record the registration time at the clock system 120. If the electronic signal 380 of step 375 was previously transmitted with respect to this non-compliance event, then step 390 can include interrupting or canceling instruction to communicate the signal 380 to the portable electronic device 130.

If detected that no previous signal 380 sent in accordance to step 390, then step 395 can include detecting or calculating if the acquired location data indicative of the presence of portable electronic device 130 associated with the individual identifier code of the individual 105 at the workplace is within the predefined area 110 in accordance to information data for the predefined workshift data file 340.

If detecting acquired location data indicative of the presence of the portable electronic device 130 associated with individual identifier code at the predefined area 110 of the workplace in accordance or matching the information data of the workshift data file 340, then step 400 can include querying or retrieving the workshift data file 340 at the work schedule database 335 for information data associated with predefined intermediate time break period data within the predefined workshift data file 340 indicative that the individual associated with the individual identifier code should perform clock-out registration for a break or leave from the workshift data file 340. Step 405 can include detecting or comparing the information data for the individual 105 in accordance with step 400 if the individual 105 should be performing clock-out registration in accordance to the predefined workshift data file 340 for the predefined time break.

Figure 4:
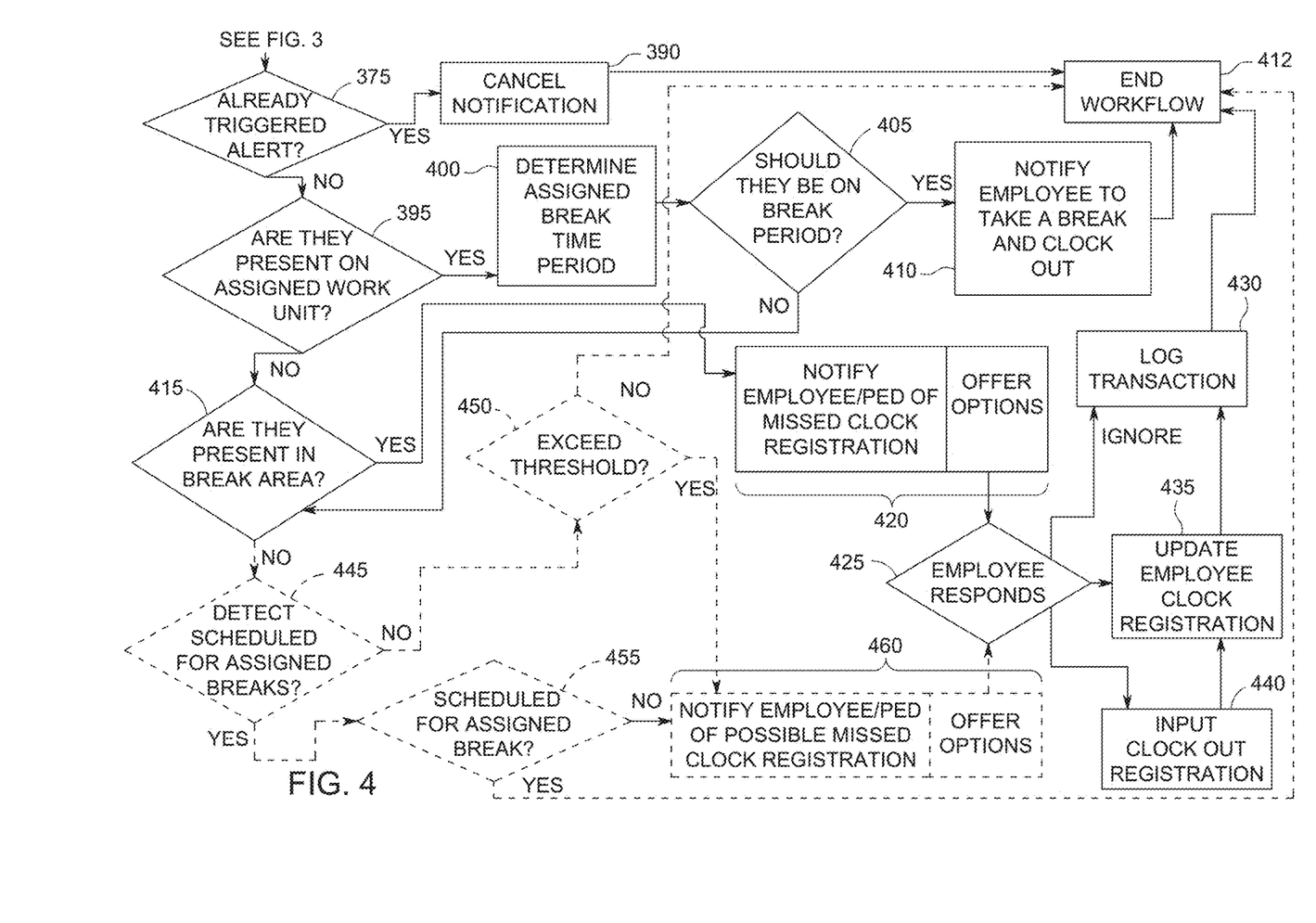
FIG. 4 shows a second part of a work flow diagram as an example of a method of operating the system of FIG. 1 in accordance with the subject matter described herein.

Step 410 can include communicating or transmitting an alert signal or message from the main controller 125 to the portable electronic device 130 associated with the individual to perform clock-out registration at the time clock system in accordance to the predefined break time periods of the workshift data file 340. Step 412 is end of the workflow. If at step 405, the main controller calculates from the retrieved data of the workshift data file that the individual 105 should not be clocked-out for a predefined time break, then step 415 includes calculating from the most recent acquired location data of the portable electronic device 130 associated with the individual is within a predefined break or non-work area (e.g., lunchroom) in accordance with the information data of the workshift data file 340.

If the location for the portable electronic device 130 is within the predefined break or non-work area or space, then step 420 can include transmitting an electronic message or signal 422 triggering an alert or notification at the portable electronic device 130 of the individual indicative of missed or need to perform clock-out registration at the time clock system for the break in the workshift, and prompting a feedback signal from the portable electronic device 130 acknowledging need for the individual 105 to record the registration time at the clock system 120. An example of the feedback signal 422 from the portable electronic device 130 can be electronic communication that includes code instructions for execution at the main controller 125 indicative of selection of one of the list of options including: ignore alert, an input time for registration of clock-out at the portable electronic device 130, and automatically to register a clock-out at the time clock system 120 at the time of detection of the presence of the portable electronic device 130 in the non-assigned or work break area. Another example of step 420 can include transmitting an electronic communication 422 with an instruction over the network 205, triggering the location tracking system 115 to communicate the electronic communication 380 to the portable electronic device 130, where the electronic communication 380 triggers or causes the alerts or notifications described at the respective portable electronic devices 130 associated with individual identifiers of individuals identified and recorded on the list in step 370. The electronic communication 380 can trigger the alert or notification in the form a visual notification, a vibratory notification, or an audible notification or combination thereof from the display 160 or vibration mechanism 165 or combination thereof requesting acknowledgement or feedback from the individual 105 via the portable electronic device 130.

Step 425 can include detecting receipt of the feedback electronic message or signal 422 from the portable electronic device 130 with instruction code for selection from the list of options described in step 420. For example, the feedback signal 422 can be triggered automatically from activation of the selector buttons 157 or 159 with code instructions or information data indicative of individual feedback of acknowledgement or decline or ignore, respectively, the request to record a registration time at the time clock system 120 for illustration at the output 230. If the instruction code is indicative to the main controller 125 to decline or ignore the individual's failure to register a clock-out at the time clock system 120, then step 430 can include logging or storing instruction code and time stamp of receipt and identifier code of the individual 105 associated with the portable electronic device 130 for storage and later retrieval from the main controller 125 or clocking database 185.

If the instruction code in the response signal 422 is generated per selection of the option to automatically to register a clock-out at the time clock system 120 at the time of detection of the presence of the portable electronic device 130 in the non-assigned or work break area, then step 435 includes the instruction code causing the main controller 125 to communicate or transmit an electronic message to the time clock system 120 to record the registration time for clock-out of the individual 105 from the workshift in accordance to either the last detected presence of the portable electronic device 130 associated with the individual 150 in the pre-assigned work area in accordance to the information data for the predefined work shift 314. Upon executing step 435, then proceed to log information data of the event per step 430 and continue to step 412 end of workflow.

If the instruction code in the response signal 422 is generated per selection of the option to automatically to register a clock-out at the time clock system 120 per input received at the portable electronic device 130, then step 440 includes the respective code instructions incorporated per selection of that option into the response signal causing the clock system 120 to record the clock-out registration time of the individual 105 from the workshift per the input time included in the feedback signal 422. Upon executing step 440 via step 435, then proceed to log information data of the event per step 430 and continue to step 412 end of workflow.

In an example shown in dashed line in FIG. 4, in response to detecting a presence or location data of the portable electronic device 130 associated with the individual 150 in the non-assigned or break area, step 445 can include automatically executing instructions to cause the main controller 125 to query the work schedule database 335 to identify or detect if the individual associated with the portable electronic device 130 at the non-assigned area has information data indicative of a predefined or assigned schedule for a break from the predefined workshift time period at the predefined area at the workplace. If in step 450 below or less than a threshold time limit or attempted transactions to retrieve or detect information data for the schedule of assigned breaks in the workshift time period for the individual, then proceed to step 412 end of workflow.

If the main controller 125 detects, identifies and/or retrieves a schedule of assigned breaks in the workshift time period for the individual 150, then step 455 includes calculating per information data in the workshift data file 340 if the individual is assigned to be on break or at the non-workshift area. If the main controller 125 calculates that the individual is assigned to be on break or at the non-assigned workshift area, then proceed to step 412 end of workflow.

If the main controller 125 calculates or detects exceedance of the threshold transactions or time limit in step 450 or calculates that the individual is not assigned for a break or to be away from the assigned predefined area at the workplace per the information data in the workshift data file schedule, the step 460 includes transmitting an electronic communication or signal 380 to the portable electronic device 130 of the individual 150 similar to step 420 to trigger a prompt or response per the options described above in step 420 and proceeding to step 425 waiting or detecting to receive the response signal 422.

Upon the main controller 125 counting or detecting transmission of a threshold number of electronic communications without detection of receipt of transmission of the feedback signal 422 from the portable electronic device 130, the method 300 can include automatically transmitting an electronic escalation communication or message 470 to a predefined recipient. The electronic escalation message 470 can be communicated to the remote device 200 associated with the predefined recipient, or to the portable electronic device 130 of the predefined recipient, per predefined program instructions stored at the main controller 125.

Figure 5:
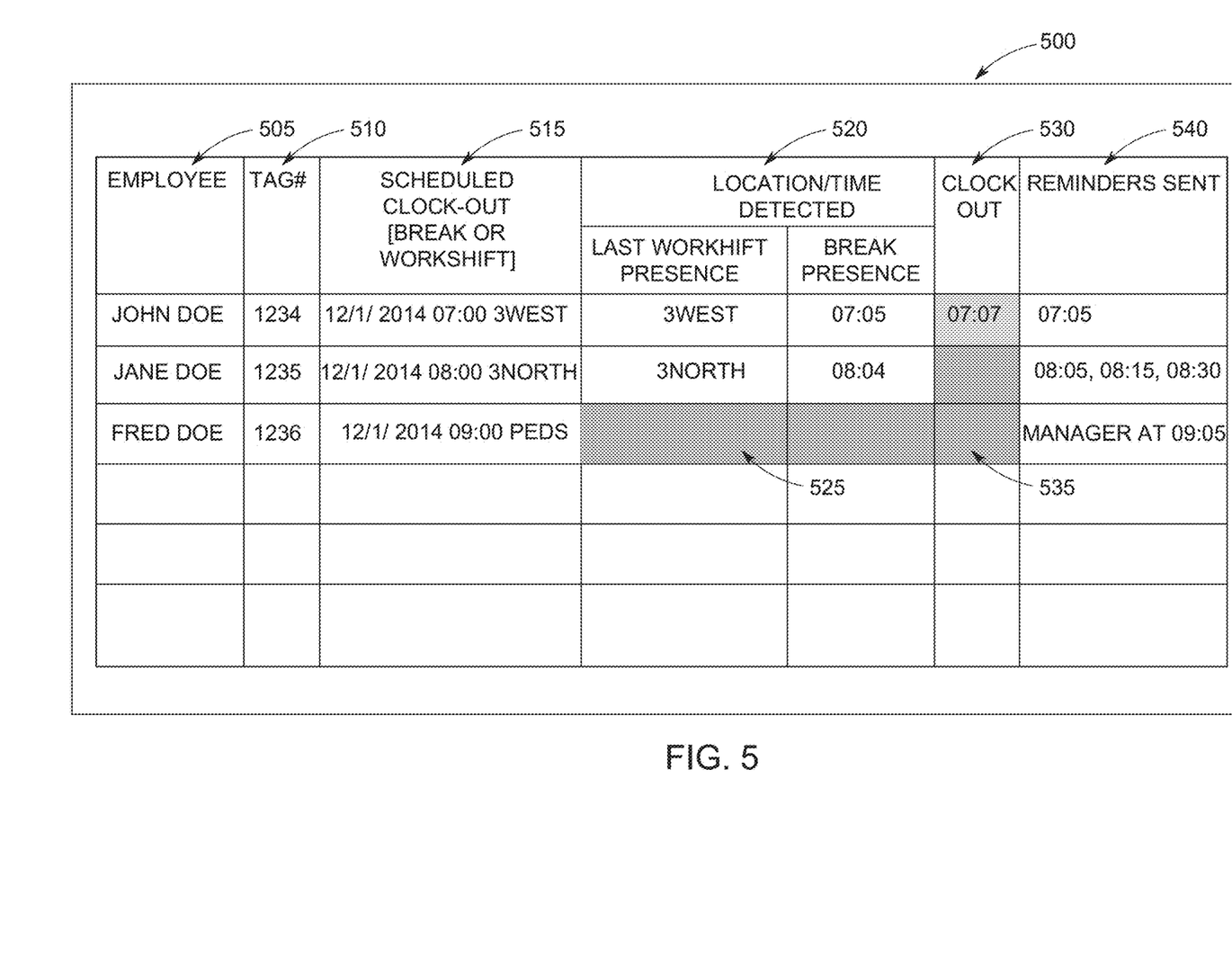
FIG. 5 shows a schematic diagram illustrative of an example of a display generated by the system of FIG. 1 in accordance to the subject matter described herein.

FIG. 5 shows a schematic diagram of an example of a graphic display 500 in accordance to the subject matter described herein for illustration at the output 230 (see FIG. 1) or remote devices 200. The display 500 can include a graphic illustration visually indicative of detected or identified events where the system 100 did not detect recording of a registration at the time clock system 120, where the illustration of each event can include a graphic illustration 505 of a list of unique individual identifications (e.g., names) of the individual 105 in event, a graphic illustration 510 of identifiers of portable electronic device(s) 130 carried by the individual 105, a graphic illustration 515 of the respective predefined scheduled end of workshift or intermediate break time periods or portion thereof (e.g., scheduled clock-out) of the individual 105 associated with the event, a graphic illustration 520 of the location data (e.g., defined area, time, portable electronic device identifier, etc.) where the location tracking system 115 detected the portable electronic device 130 carried by the individual 105 at the defined area 110 of the workplace within the time frame of the predefined workshift 314. Graphic illustration 525 can be illustrative a graphic notification (e.g., alphanumeric, symbol, color, etc.) indicative of time of acquired location data of detected presence of the individual 105 at the defined break or non-work area of the workplace. Graphic illustration 530 can include a value indicative of the recorded registration time associated with the individual 105 clocking-out at the time clock system 120 or per logged transaction in step 430. If no recorded registration time at the time clock system 120 is detected by the system 100, then the graphic illustration 535 can be a graphic notification (alphanumeric, symbol, color, etc.) similar to the graphic illustration 525 described above. Graphic illustration 540 can include a numerical value or alphanumeric description of each of the time values when particular electronic communications 380 were transmitted, or summation thereof, or time value when the escalation messages was transmitted or combination thereof.

In another example of the system 100 and method 300, the example of the portable electronic device 130 does not have the interface 150 and can configured in multiple portable electronic devices to provide similar operational function. In this example, a first portable electronic device 130 can be carried by the individual and configured in passive or active communication with the location tracking system 115 to communicate and record the location of the individual 105. A second portable electronic device 130 (e.g., cellular phone, pager, etc.), different than the first portable electronic device 130, can carried by the individual 105 and be configured to be in communication (e.g., wireless or network or combination thereof) to receive the communications from the main controller 125 and to trigger the alert or notification to the individual to acknowledge the failure to register with the time clock system 120.

Although the above description of the system 100, method 300 and graphic display 500 is directed to the example of the individual 105, the subject matter described herein is not limited to this example, The system 100, method 300 and graphic display 500 can be directed to time and attendance of various types of assets, such as a machine or hardware device equipped to carry the portable electronic device, in a similar manner as directed to the individual 105 as described above.

A technical effect of the subject matter described above can include, but is not limited to, providing the system 100 and method 300 of time and attendance that automatically and in general real-time monitors or audits a presence of the individual 105 and associated compliance with recording or registration of time of attendance (e.g., clock-out) at the time clock system 120, and that automatically triggers electronic communications that reduces payroll review, correction and human intervention while sustaining employer-individual 105 goodwill. The system 100 and method 300 can employ real-time location system (RTLS) in conjunction with a time clock system 120 to create a list of individuals 105 scheduled for end or break from a workshift but not registered or recorded as clocked-out within a certain time frame of a predefined workshift. The system 100 and method 300 can remove those individuals 105 from the list that record a registration time of clock-out at the time clock system 120 in compliance with the workshift data file 340. Within a threshold of the schedule time for individuals 105 to register or record clock-out for end or break of attendance, the system 100 and method 300 automatically queries the location tracking system 115 to detect if individuals 105 that failed to record a clock-out registration time are within the predefined area 110 of the workplace, and if so, to automatically facilitates the electronic communication 380 to cause an alert or notification (e.g., phone messaging or vibrating a portable electronic device 130 carried by the individual 105). Upon transmitting the electronic communication 380, the system 100 and method 300 monitors or detects if received the electronic communication 422 indicating an acknowledgement by the individual 105 of the need to record a clock-out registration time with the time clock system 120. If the system 100 and method 300 fail to detect the electronic communication 422 indicative of individual acknowledgement of the need to register or the individual 105 fails to respond, the system 100 and method 300 automatically transmits the electronic communication 470 to remote device 200 or portable electronic device 130 carried by the designated or predefined recipient to indicate the recordation failure event and the failure to correct the event. As such, the system 100 and method 300 facilitates notification and call to action when the individual 105 is scheduled for a clock-out or end of the predefined workshift or start of an intermediate break from the workshift time period therein, detected per location data to at a predefined break or non-work area or space, and yet has failed to officially clock-out registration time at the time clock system 120. Further, the system 100 and method 300 automatically trigger electronic communications 380 to facilitate correction in a timely manner. In addressing such failures to clock-out, the system 100 and method 300 reduces time and expense to make corrections and further improves the accuracy in monitoring the labor productivity at the workplace.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system to track a time of attendance of an individual for a workshift at a workplace, the system comprising:
    a location tracking system having a stationary wireless device that detects a presence of a portable electronic device uniquely associated with and carried by the individual, the portable electronic device including a first microprocessor connected to an interface;

a time clock system that records a clock-out registration time of the individual in accordance to an information data of workshift time period and predefined area of workplace for a scheduled workshift data file of the individual at the workplace; and a main controller having a second microprocessor connected in communication with the location tracking system and the time clock system, wherein in response to the main controller receiving an electronic communication indicative that the portable electronic device is not at a predefined work area of the workplace per information data of the scheduled workshift data file, and if the main controller does not detect recording of the clock-out registration time at the time clock system by the individual, then main controller automatically causes an alert at the portable electronic device prompting the individual to transmit a feedback signal acknowledging need to record the clock-out registration time at the time clock system.

2. The system of claim 1, wherein the main controller automatically causes the alert at the portable electronic device upon further detecting a current time at least later than one of a predefined break time period data element and an end time of a scheduled work shift time period data element in a workshift file associated with the individual at the workplace.

3. The system of claim 1, wherein the alert triggers the portable electronic device to generate a graphic display of a scroll down menu of a group of predetermined options to communicate as instruction code to the main controller, the group of options including an input time and a time correlated to a last acquired location data of the presence of the portable electronic device associated with the individual at the workplace.

4. The system of claim 2, wherein after a threshold number of communications to trigger the alert at the portable electronic device with no detection of the receipt of the acknowledgement, the main controller automatically communicates an electronic message with an instruction to the clock system to automatically enter a time correlated to the last acquired located data of the presence of the individual at the workplace.

5. The system of claim 1, wherein the electronic communication from the main controller triggers one of a group of alerts at the portable electronic device, the group consisting of: a vibratory alert, a visual notification, and an audible alert.

6. The system of claim 1, wherein the feedback signal transmitted from the portable electronic device of the individual causes the clocking system to register one of a start time of a predefined break and an end time of the predefined workshift time period as the clock-out time of the individual.

7. The system of claim 1, wherein the feedback signal transmitted from the portable electronic device of the individual causes the clocking system to register an input time as encoded in the electronic message of acknowledgement from the portable electronic device.

8. The system of claim 1, wherein when the main controller detects communication of a threshold number of electronic messages to trigger the alert at the portable electronic device without detecting receipt of an electronic message of acknowledgement from the portable electronic device, then the main controller communicates an escalation message in electronic format to a remote device of a predefined recipient different than the individual.

9. The system of claim 1, wherein upon the location tracking system detecting an updated location data different than previous acquired location data, the updated location data indicative of a return of the presence of the individual to an assigned work area at the workplace, the main controller suspends trigger of electronic communications to the portable electronic device.

10. The system of claim 1, wherein upon the clock system recording indicative a clock-out registration time of the individual at the clock system and communicating an electronic message indicative of such to the main controller, the main controller automatically suspends trigger of electronic communications to portable electronic device.

11. A method to track a time of attendance of an individual for a workshift at a workplace, the method comprising the steps of:

detecting via a wireless reader a location data indicative of a presence of a portable electronic device uniquely associated with and carried by the individual, the portable electronic device including a first microprocessor connected to an interface;

detecting a clock-out registration time of the individual at a time clock system, storing an information data of a workshift time period and predefined area of workplace for a scheduled workshift data file of the individual at a workshift database, the workshift time period including a start time, an end time, and an intermediate break start and end time between the workshift start time and the end time; and in response to 1) a main controller receiving an electronic communication indicative that the portable electronic device is not at a predefined work area of the workplace per information data of the scheduled workshift data file, and 2) not detecting a clock-out registration time at the time clock system by the individual, then main controller automatically causing an alert at the portable electronic device prompting the individual to transmit a feedback signal acknowledging need to record the clock-out registration time at the time clock system.

12. The method of claim 11, wherein the step of the main controller automatically causing the alert at the portable electronic device is in response to further detecting a current time at least later than one of a predefined break time period data element and an end time of a scheduled work shift time period data element in a workshift data file associated with the individual at the workplace.

13. The method of claim 11, wherein causing the alert includes the step of triggering the portable electronic device to generate a graphic display of a scroll down menu of a group of predetermined options to communicate as instruction code to the main controller, the group of options comprising: an input clock-out time, and a clock-out time correlated to a time of a last acquired location data of the presence of the portable electronic device associated with the individual at the assigned area at the workplace in accordance to the information in the workshift data at the workshift database.

14. The method of claim 11, wherein after detecting a threshold number of communications to trigger the alert at the portable electronic device with no detection of the receipt of the acknowledgement, automatically transmitting an electronic message from the main controller with an instruction to the clock system to automatically enter a clock-out time correlated to a last acquired location data of the presence of the portable electronic device associated with the individual at the assigned area at the workplace in accordance to the information in the workshift data at the workshift database.

15. The method of claim 11, wherein the step of triggering the alert includes causing one of a group of alerts at the portable electronic device, the group consisting of: a vibratory alert, a visual notification, and an audible alert.

16. The method of claim 11, further including the step of causing the clocking system to register one of a start time of a predefined break and an end time of the predefined workshift time period as the clock-out time of the individual in response to code instructions included the feedback signal for the portable electronic device.

17. The method of claim 11, further including the step of causing the clocking system to register a clock-out registration time as encoded in the electronic message of acknowledgement transmitted from the portable electronic device.

18. The method of claim 11, wherein upon detecting transmission of a threshold number of electronic messages to trigger the alert at the portable electronic device without detecting receipt of an electronic message of acknowledgement from the portable electronic device, transmitting from the main controller an escalation message in electronic format to a remote device of a predefined recipient different than the individual.

19. The method of claim 11, wherein upon detecting by the location tracking system an updated location data different than a previous acquired location data of the portable electronic device associated with the individual, and wherein the main controller calculates that the updated location data is indicative of a return of the presence of the individual to an assigned work area at the workplace in accordance with the workshift data file, then suspending further trigger of electronic communications from the main controller triggering the alert at the portable electronic device.

20. The method of claim 11, wherein upon the clock system recording a clock-out registration time of the individual at the clock system and communicating an electronic message indicative of such to the main controller, the main controller automatically suspends further transmitting of electronic communications to trigger the alert at the portable electronic device.

* * * * *